United States Patent
Steuart, III

(10) Patent No.: US 7,463,280 B2
(45) Date of Patent: Dec. 9, 2008

(54) DIGITAL 3D/360 DEGREE CAMERA SYSTEM

(76) Inventor: Leonard P. (Skip) Steuart, III, 19537 Greggsville Rd., Purcellville, VA (US) 20132

( * ) Notice: Subject to any disclaimer, the term of this patent is extended or adjusted under 35 U.S.C. 154(b) by 814 days.

(21) Appl. No.: 10/452,726

(22) Filed: Jun. 3, 2003

(65) Prior Publication Data

US 2004/0246333 A1 Dec. 9, 2004

(51) Int. Cl.
*H04N 7/00* (2006.01)
*H04N 13/00* (2006.01)

(52) U.S. Cl. .......................................... 348/36; 348/42
(58) Field of Classification Search .................... 348/36, 348/38, 42; 345/427, 419; 445/30
See application file for complete search history.

(56) References Cited

U.S. PATENT DOCUMENTS

| | | | |
|---|---|---|---|
| 1,957,043 A | 5/1934 | Harlow | |
| 2,267,813 A | 12/1941 | Buckner | |
| 3,144,807 A | 8/1964 | Coombs, Jr. | |
| 3,420,605 A | 1/1969 | Kipping | |
| 3,980,394 A | 9/1976 | Zapf | |
| 4,355,328 A | 10/1982 | Kulik | |
| 4,357,081 A | 11/1982 | Moddemeijer | |
| 4,589,030 A | 5/1986 | Kley | |
| 4,834,686 A * | 5/1989 | Kautz et al. ................... | 445/30 |
| 4,890,314 A | 12/1989 | Judd et al. | |
| 4,985,762 A | 1/1991 | Smith | |
| 5,016,109 A | 5/1991 | Gaylord | |
| 5,023,725 A * | 6/1991 | McCutchen ................... | 348/38 |
| 5,179,440 A | 1/1993 | Loban et al. | |
| 5,187,571 A | 2/1993 | Braun et al. | |
| 5,264,881 A | 11/1993 | Brooke | |
| 5,455,689 A | 10/1995 | Taylor et al. | |
| 5,495,576 A | 2/1996 | Ritchey | |
| 5,539,483 A | 7/1996 | Nalwa | |
| 5,646,679 A | 7/1997 | Yano et al. | |
| 5,708,469 A | 1/1998 | Herzberg | |
| 5,745,126 A | 4/1998 | Jain et al. | |
| 5,745,305 A | 4/1998 | Nalwa | |

(Continued)

FOREIGN PATENT DOCUMENTS

DE 37 39 697 C1 12/1988

(Continued)

OTHER PUBLICATIONS

Seegrid, Perceptive Mobile Automation, How It Works, http://www.seegrid.com/pages/how.html (6 pages).

(Continued)

*Primary Examiner*—Allen Wong
(74) *Attorney, Agent, or Firm*—Finnegan, Henderson, Farabow, Garrett & Dunner LLP

(57) ABSTRACT

The digital 3D/360° camera system is an omnidirectional stereoscopic device for capturing image data that may be used to create a 3-dimensional model for presenting a 3D image, a 3D movie, or 3D animation. The device uses multiple digital cameras, arranged with overlapping fields of view, to capture image data covering an entire 360° scene. The data collected by one, or several, digital 3D/360° camera systems can be used to create a 3D model of a 360° scene by using triangulation of the image data within the overlapping fields of view.

43 Claims, 14 Drawing Sheets

U.S. PATENT DOCUMENTS

| | | | |
|---|---|---|---|
| 5,920,337 | A | 7/1999 | Glassman et al. |
| 6,002,430 | A | 12/1999 | McCall et al. |
| 6,005,987 | A | 12/1999 | Nakamura et al. |
| 6,034,716 | A | 3/2000 | Whiting et al. |
| 6,141,145 | A | 10/2000 | Nalwa |
| 6,236,428 | B1 | 5/2001 | Fukushima |
| 6,252,603 | B1 * | 6/2001 | Oxaal .................. 345/427 |
| 6,256,099 | B1 * | 7/2001 | Kaufman et al. .......... 356/603 |
| 6,392,688 | B1 | 5/2002 | Barman et al. |
| 6,459,491 | B1 | 10/2002 | Nguyen |
| 6,473,238 | B1 | 10/2002 | Daniell |
| 6,507,358 | B1 | 1/2003 | Mori et al. |
| 6,774,894 | B1 * | 8/2004 | Lin et al. .................. 345/419 |
| 6,947,059 | B2 | 9/2005 | Pierce et al. |
| 2001/0010555 | A1 | 8/2001 | Driscoll, Jr. |
| 2001/0020976 | A1 | 9/2001 | Peleg et al. |
| 2002/0113875 | A1 | 8/2002 | Mazzilli |

FOREIGN PATENT DOCUMENTS

| | | |
|---|---|---|
| EP | 0 519 744 B1 | 11/1996 |
| EP | 0 793 074 A1 | 9/1997 |
| JP | 2002090921 | 3/2002 |
| WO | WO 02 065786 A | 8/2002 |
| WO | WP 02/075434 A1 | 9/2002 |

OTHER PUBLICATIONS

Seegrid, Perceptive Mobile Automation, About Us, http://www.seegrid.com/pages/about.html (3 pages).
Point Greg, Corporate Profile—Overview, http://www.ptgrey.com/corporate.profile.html (6 pages).
Romain et al., "An Omnidirectional Stereoscopic Sensor: Speherical Color Image Acquistion," Jul. 29, 2002 (1 page).
PCT Search Report and Written Opinion, Jul. 12, 2006 (8 pages).
Morris, Dan et al., "Alternative sensory representations of the visual world." Winter 2002, pp. 1-13, http://techhouse.brown.edu/~neel/hapic.scene.representation/.
Moravec, Hans et al, "Robust Navigation by Probabilistic Volumetric Sensing." Carnegie Mellon University, The Robotics Institute, Jan. 1999 (3 pages).
www.archive.org, "Experiencing Mars Virtual Presence in the Future," http//www.fourth-millennium.net/stereo-spacecraft/virtualpresence.html (1 page).
Neumann, Jan et al., "Eyes from Eyes: Analysis of Camera Design Using Plenoptic Video Geometry," Center for Automation Research, University of Maryland, Dec. 2001 (2 pages).
First Person Company, 2002 (1 page).
Sun, Xinding et al., "Recording the Region of Interest from Flycam Panoramic Video," Department of Electrical and Computer Engineering, University of California, Image Processing 2001 Proceedings, International Conference on, Published 2001, vol. 1, pp. 409-412.
Moravec, Hans "Robust Navigation by Probabilistic Volumetric Sensing," Carnegie Mellon University, Robotics Institute, May 1, 1999 to Apr. 30, 2002 (17 pages).
Immersive Media Telemmersion, "Dodeca 1000 Camera:Telemmersion Video System," Immersive Media Company, Portland, Oregon (3 pages).
iMove SVS 2500 System Spoecifications (2 pages).
Slater, Dan, "Panoramic Photography with Fisheye Lenses," IAPP Journal, 1996 (10 pages).
Pless, Robert, "Using Many Cameras as One," Department of Computer Science and Engineering, Washington University in St. Louis, 2003 (7 pages).
Point Grey Research, "Spherical Digital Video Camera," Insights Newsletter, May 2002 (5 pages).
"RingCam", htt://research.microsoft.com/~rcutler/ringcam/ringcam.htm (2 pages).
Nanda, Harsh et al., "Practical calibrations for a real-time digital omnidiectional camera," 2001 (4 pages).
Cutler, Ross et al., "Distributed Meetings: A Meeting Capture and Broadcasting System," Microsoft Research, 2000 (10 pages).
"3 Stereo Omni-Directional System (SOS)," Proceedings of the 6th Symposium on Sensing via Imaging Information, Jun. 14-16, 2000 (2 pages).
Slater, Dan "A full sphere camera for point of view and VR photography," Spherecam (16 pages).
Weerasinghe, Chaminda et al., Stereoscopic Panoramic Video Generation Using Centro-Circular Projection Technique, IMSP-P6, Apr. 8, 2003, (1 page).
Swaminathan, Rahul et al., "Polycameas: Camera Clusters for Wide Angle Imaging CUCS-013-99," Department of Computer Science, Columbia University, New York, New York, 1999 (30 pages).
Swaminathan, Rahul et al., "Non-Metric Calibration of Wide-Angle Lenses and Polycameras," IEEE 1999 (pp. 413-419).
Wren, Christopher R. et al., "Volumetric Operations with Surface Margins," Mitsubishi Electronic Research Laboratories, Inc., Jan. 2002 (4 pages).
"Stereo News," Videre Design www.videredesign.com (6 pages).
Zobel, Matthias et al., "Binocular 3-D Object Tracking with Varying Focal Lengths," Proceedings of the IASTED International Conference on Signal Processing, Pattern Recognition, and Application, (SPPRA 2002) (pp. 325-330).
Zobel, Matthias et al., "MOBSY: Integration of Vision and Dialogue in Service Robots," Computer Vision Systems, Proceedings Second International Workshop, ICVS Jul. 7-8, 2001 (pp. 50-62).
Tanahashi, H. et al., "Development of a stereo omnidirectional system (SOS)," Industrial Electronics Society, 2000 IECON 2000, vol. 1, Oct. 2000, (pp. 289-294).
Moravec, Hans "Mere Machine to Transcendent Mind," Oxford University Press, 1999 (2 pages).
www.archive,org, "Experiencing Mars Virtual Presence in the Future," http//www.fourth-illennium.net/stereo-spacecraft/virtualpresence.html, Jul. 7, 2002 (according to www.archive.org) (1 page).
Immersive Media Telemmersion, "Dodeca 1000 Camera:Telemmersion Video System," Immersive Media Company, Portland, Oregon, 1998 (3 pages).
iMove SVS 2500 System Specifications, Nov. 17, 2002,(2 pages).
"RingCam", http://research.microsoft.com/~rcutler/ringcam/ringcam.htm, retrieved Jul. 18, 2007 (2 pages).
Slater, Dan "A full sphere camera for point of view and VR photography," Spherecam, 2000 (16 pages).
"Stereo News," Videre Design www.videredesign.com, 2000 (6 pages).
Seegrid, Perceptive Mobile Automation, How It Works, http://www.seegrid.com/pages/how.html, retrieved Nov. 7, 2005 (6 pages).
Seegrid, Perceptive Mobile Automation, About Us, http://www.seegrid.com/pages/about.html, retrieved Nov. 7, 2005 (3 pages).
Point Greg, Corporate Profile - Overview, http://ptgrey.com/corporate.profile.html, 2002 (6 pages).

* cited by examiner

DIGITAL 3D/360 DEGREE CAMERA SYSTEM

BACKGROUND OF THE INVENTION

1. Field of the Invention

The present invention relates to the field of image recording devices, and more particularly to a digital 3D/360 degree camera system. The digital 3D/360° camera system utilizes a plurality of stereoscopic camera pairs to capture image data covering an entire 360° scene that may be used to create a 3D image, a 3D movie, or 3D animation.

2. Description of the Related Art

The advent of digital cameras of increasing resolution and photo quality, along with constantly increasing speed and processing power of computers, has laid the foundation for a 3-dimensional, 360° digital camera system capable of capturing image data for the creation of 3-dimensional images, movies, animation, and telepresence.

3-dimensional photography is not new. 3-dimensional photography has been available for over one hundred years through stereoscopic cameras. In a stereoscopic camera system, two cameras are used to capture a scene, each from a slightly different vantage point. The camera configuration is typically similar to the human eyes; with two cameras side-by-side and capturing two separate, but largely overlapping, views. The two images are viewed together through a stereoscopic viewer, giving the visual perception of three dimensions where the images overlap.

U.S. Pat. No. 1,957,043, issued to J. Harlow on May 1, 1934, describes a stereoscopic camera and viewing device. Such simple stereoscopic photography does nothing to achieve an expanded or panoramic field of view. Additionally, because the result of a stereoscopic photo is intended for direct human viewing through a stereoscopic viewer, the camera and the images it produces must conform to constraints of comfortable human viewing. For optimal human stereographic viewing, the field of view and the degree of overlap of the images must approximate the human eyes. Modern digital image processing can use computer technology to take advantage of images that fall well outside of these constraints, since images may be taken for the purpose of digital processing and not for direct human viewing.

Panoramic photography, the taking of a photograph or photographs covering a field of view that is wide to an entire 360° panorama, has a long history in photography. Perhaps the most primitive method of panoramic photography is the taking of several adjoining photos with a conventional camera and then mounting the prints together in alignment to achieve a complete panorama. Modern techniques adapt this method by using digital cameras to capture the image, and then using computer image processing techniques to align the images for printing as a single panoramic image.

U.S. Pat. No. 5,646,679, issued on Jul. 8, 1997 to K. Yano et al., discloses an image combining method and apparatus that uses a pair of digital cameras to capture separate overlapping images. The overlapping portions of the images are used to correlate the images for alignment. With the separate images aligned, a single image over a wide field of view may be created. An image processing system then combines the images for viewing.

U.S. Pat. No. 6,005,987, issued to M. Nakamura et al. on Dec. 21, 1999, shows a picture image forming apparatus that similarly forms a panoramic picture image by joining separate picture images. Like Yano, the Nakamura apparatus uses the overlapping regions of the images to align and join the images. The Nakamura apparatus additionally corrects deviations and distortions in the overlap regions.

While achieving improved panoramic photography, these methods do not provide the visual image data necessary to produce a 3-dimensional image or model. Additionally, where a panorama is composed of several individually exposed images, the result is limited in quality and utility by the dimension of time. Where the several images are exposed separately over a period of time, elements in the scene that may have moved are captured in different positions in the separate images. The result may be an image with unsynchronized moving elements within the exposures, rendering the images difficult or impossible to join, or a joined panoramic view with double images.

An alternative method of capturing a panoramic image is to capture the entire panorama in a single exposure. One such approach has been to use a camera with a rotating lens, or a rotating camera. In a film camera, a rotating lens can expose a strip of film as the lens sweeps the entire 360° view.

Another approach to a single-exposure panoramic camera is disclosed in U.S. Patent Publication No. 2001/0010555, published on Aug. 2, 2001. The panoramic camera uses a convex mirror to capture a 360° panorama in a 2-dimensional annular form. The annular image, digitally captured, is digitally transformed into a 2-dimensional rectangular image. While this approach solves the time-dimension problem by capturing the entire panoramic view in a single exposure, the result remains a 2-dimensional image that does not provide the image data needed to produce a 3-dimensional model or image.

U.S. Patent Publication No. 2001/0020976, published on Sep. 13, 2001, describes a stereo panoramic camera arrangement. This arrangement joins two panoramic cameras into a stereoscopic pair. In each of the cameras, a specialized mirror, or fresnel lens, is used to redirect the panoramic image for recording. One embodiment presented requires a cylindrical, rather than planar, optical element to record the image. Thus, while providing a panoramic camera with stereoscopic capability, this is not a solution that lends itself to the use of readily available and simple digital cameras.

U.S. Pat. No. 5,495,576, issued on Feb. 27, 1996 to K. Ritchie, discusses an audio-visual system that incorporates cameras to capture panoramic imagery, along with shape sensors to determine the 3-dimensional shape of a scene. The captured image is mapped to the shape to create a 3-dimensional model that may be processed for display on various 3-D display systems. The shape sensors are essentially radar, sonar, or similar sensors arrayed along with the cameras. The shape sensors function to gather information about the shape of objects in the field of view, primarily in terms of distance to the surface of the objects. Thus, the 3-dimensional model is the result of a combination of data sources rather than a product based strictly on stereoscopic image data.

U.S. Pat. No. 5,023,725, issued on Jun. 11, 1991 to D. McCutchen, discloses a dodecahedral imaging system in which several cameras are arranged in a dodecahedron. Along with the camera system, McCutchen discloses a projection dome with a dodecahedral shape to match the camera. While the system captures video of a generally spherical field of view for projection onto the interior surface of a dome or spherical theater, the video is not 3-dimentional. The cameras are not oriented to provide stereoscopic fields of view. The field of view of each camera is, in fact, cropped to align the various views for projection onto the interior of the dodecahedral dome with no overlap.

None of the above inventions and patents, taken either singly or in combination, is seen to describe the instant invention as claimed. Thus a digital 3D/360° camera system solving the aforementioned problems is desired.

SUMMARY OF THE INVENTION

The digital 3D/360° camera system uses several digital cameras to capture image data that is necessary to create an accurate digital model of a 3-dimensional scene. This model may be used to produce a 3-D image, a 3-D movie, 3-D animation, or other visual 3-dimensional product. The image data captured may also be used for creation of 2-dimensional panoramic images and, with certain configurations, human viewable stereoscopic images. The cameras are oriented so that each camera's field of view overlaps with the field of view of at least one other camera to form a stereoscopic field of view. The image data from the stereoscopic fields of view may be processed, using stereoscopic techniques, to create a full 3-dimensional model. For accuracy of the image data, the cameras are rigidly mounted together on a housing and their precise geometry is determined by a calibration process. The cameras are commanded simultaneously, or in synchronization within 1 ms or less, to capture their images.

In the simplest embodiment of the invention, the cameras are mounted on a square housing with a pair of cameras on each of four faces of the square. The cameras, configured as stereoscopic pairs, are aimed in a "north, south, east, west" fashion so that each stereoscopic pair captures a separate quadrant of a 360-degree field of view in a stereoscopic field of view. The stereoscopic field of view is the region that is visible to both cameras in a stereoscopic pair, where their fields of view overlap. The field of view of the cameras used dictates the amount of overlap of the members of a stereoscopic pair, as well as the size of blind spots between cameras and between adjacent quadrants. An alternate embodiment adds stereoscopic pairs in a more complex geometric arrangement, while another embodiment distributes the cameras uniformly around a sphere.

When disposed in either a circular arrangement or a spherical arrangement, the cameras are no longer grouped in literal stereoscopic pairs. Instead, each camera may be considered in stereoscopic partnership with each of the adjacent cameras. When disposed in a spherical arrangement, the digital 3D/360° degree camera system captures a full spherical view in an optimal arrangement for rendering of a 3-dimensional model.

The cameras are controlled by a computer that manages data describing the physical geometry of the cameras and their relationship to one another, commands the cameras simultaneously to capture image data, reads, saves and stores the image data, and exports the image data for processing.

Multiple digital 3D/360° camera systems may be used in cooperation at separate locations to gather more comprehensive 3-dimentional image data for a larger scene or region.

Accordingly, it is a principal object of the invention to provide a digital 3D/360° camera system that captures stereoscopic image data that is necessary to create an accurate model of a 3-dimensional scene.

It is another object of the invention to provide a digital 3D/360° camera system that captures stereoscopic image data that is necessary to create an accurate model of a fully panoramic 360°, 3-dimensional scene.

It is a further object of the invention to provide a digital 3D/360° camera system that incorporates multiple cameras disposed to capture image data in multiple stereoscopic fields of view.

Still another object of the invention is to provide a digital 3D/360° camera system that eliminates time-errors in a multi-image stereoscopic camera system by simultaneous operation of numerous cameras.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
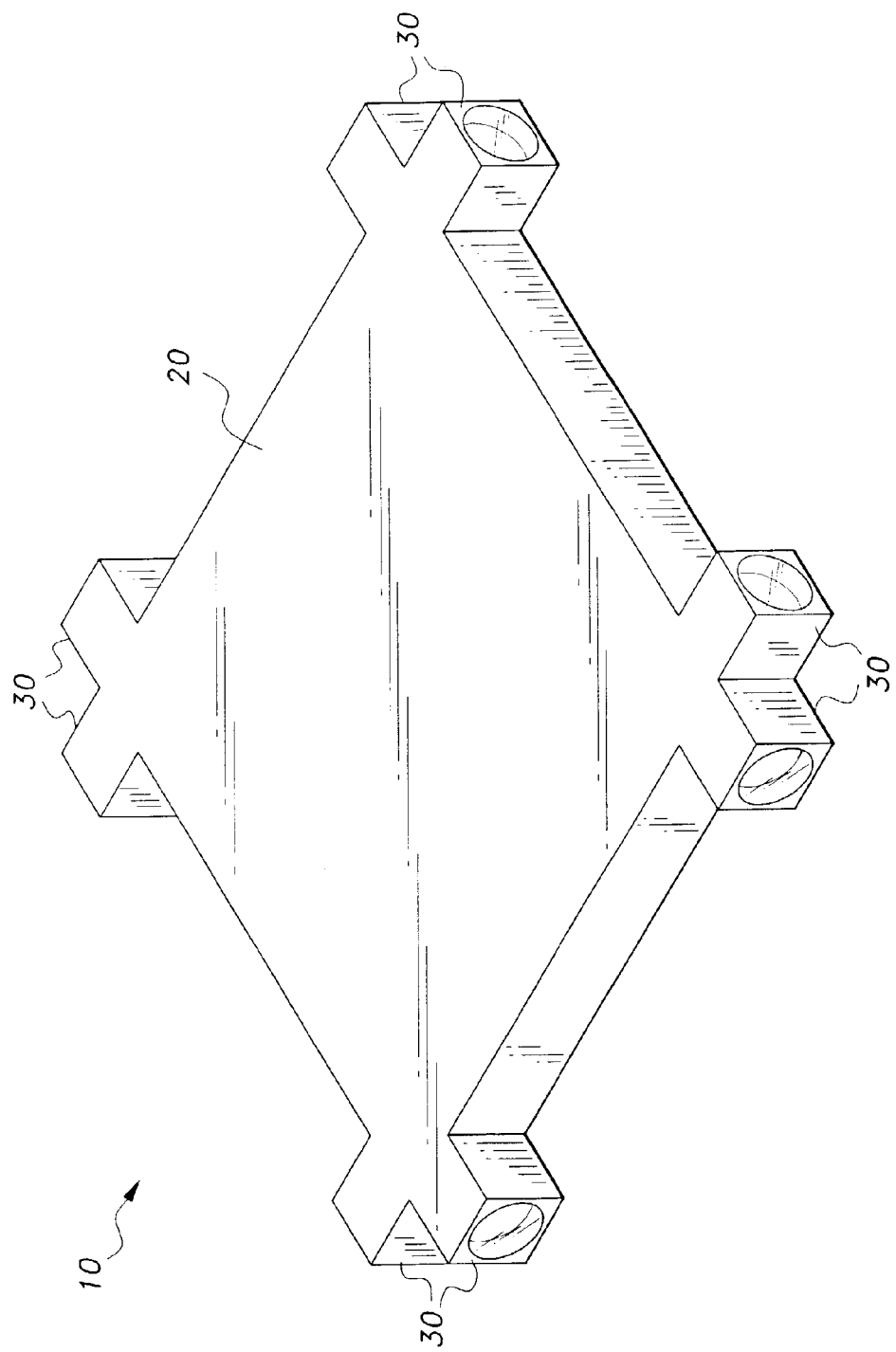
FIG. 1A is a perspective view of a digital 3D/360° camera system according to the present invention.
Figure 1B:
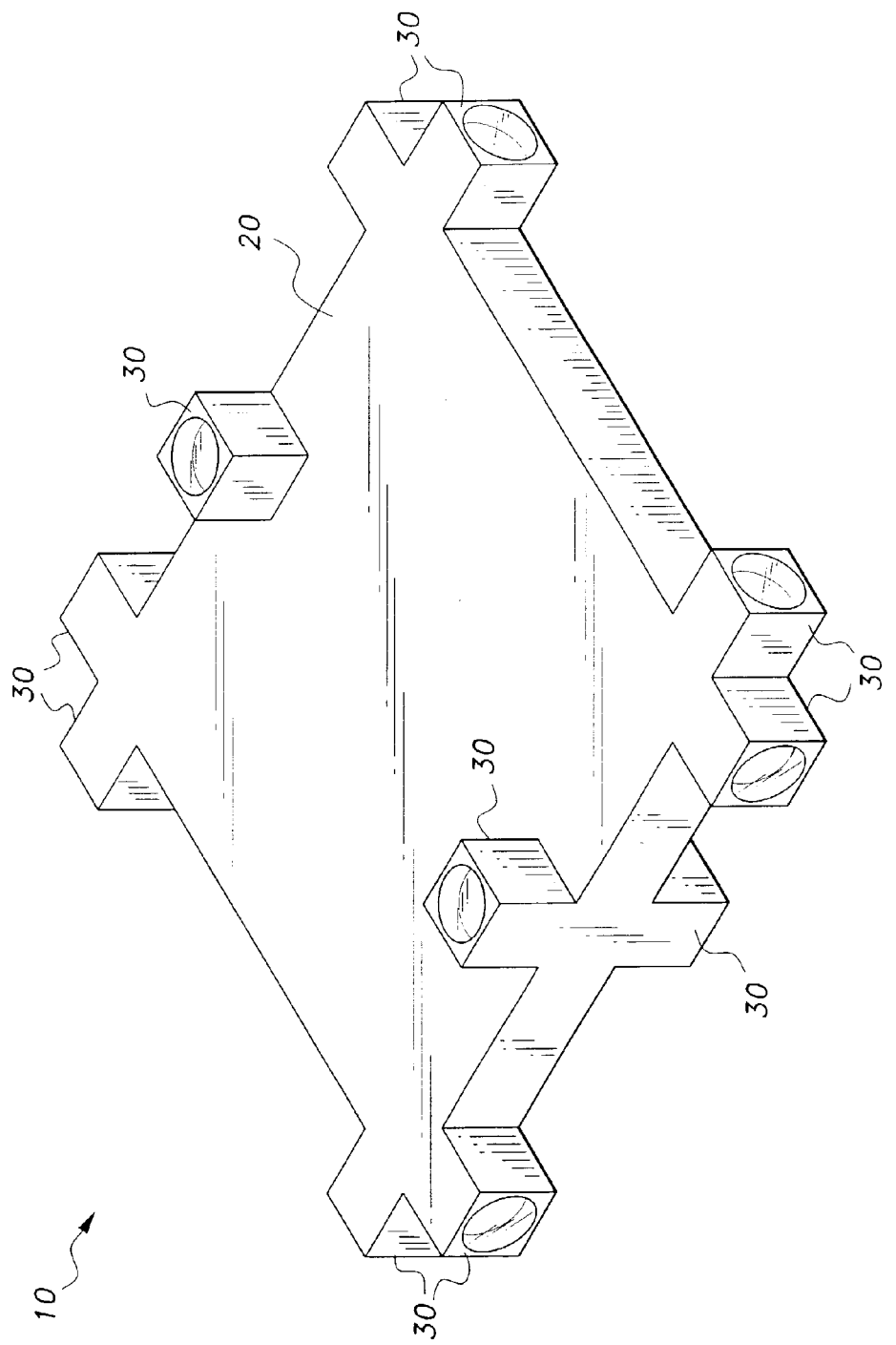
FIG. 1B is a perspective view of a digital 3D/360° camera system according to the present invention, optionally equipped with additional pairs of upward and downward oriented cameras.

The present invention is a digital 3D/360° camera system, designated generally as 10 in the drawings. The digital 3D/360° camera system 10 has a housing 20 with a number of digital cameras 30 mounted thereon, the digital cameras 30 being oriented so that each camera's field of view overlaps with the field of view of at least one other camera to form a stereoscopic field of view. In the simplest embodiment, depicted in FIG. 1A, the housing 20 is square and the cameras 30 are arranged in stereoscopic pairs with each stereoscopic pair covering a separate quadrant of a full 360° view. FIG. 1B shows an alternate embodiment wherein an additional stereoscopic pair of digital cameras 30 is oriented with an upward view, and an additional stereoscopic pair of digital cameras 30 is oriented with a downward view.

In traditional stereoscopic photography, two cameras in a stereoscopic pair are spaced about two inches apart and each has a view angle that simulates the human eye. This recreates a 3-dimensional view that is comfortable for human viewing. However, the digital 3D/360° camera system 10 functions to capture data that will be processed by a computer into a 3-dimensional model. Thus, the geometry of the digital cameras 30 and their fields of view are free from the constraints imposed on traditional stereoscopic photography. Regardless of the geometry of the cameras 30, the cameras 30 are rigidly mounted and their precise geometry is known. The digital cameras 30 may be spaced any distance apart. For example, a digital 3D/360° camera system 10 used inside a room or to capture a small scene may be constructed with the cameras separated by only inches, while a digital 3D/360° camera system 10 used to cover an airport or a city block may be constructed with the cameras separated by several feet. With the digital cameras 30 arranged in stereoscopic pairs where each pair captures a single quadrant of the 360-degree field, the lenses should have a field of view of about 100°.

Figure 2:
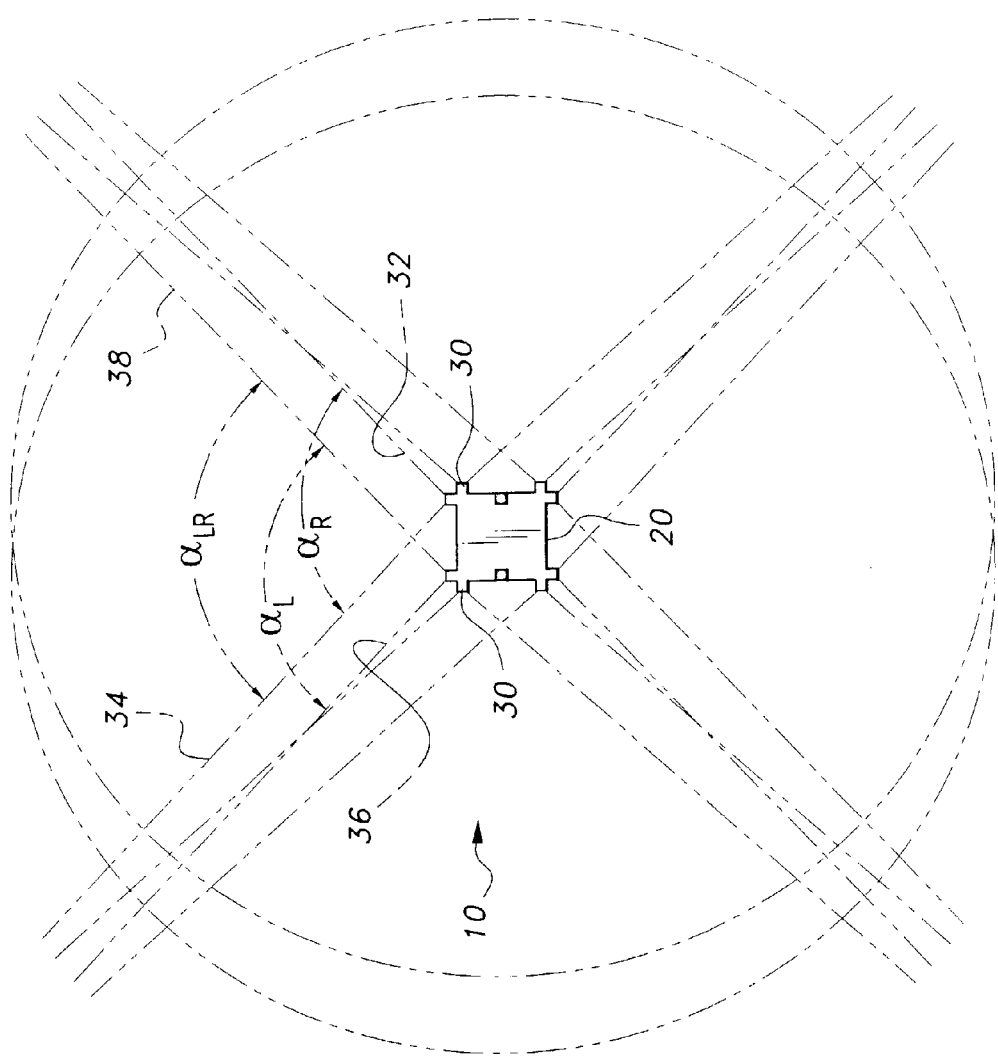
FIG. 2 is a top view of a digital 3D/360° camera system according to the present invention, showing the camera fields of view and blind spots.

FIG. 2 shows a top view of the digital 3D/360° camera system 10, along with the field of view for each of the digital cameras 30. The view angle is depicted as $\alpha_L$ for a left-side member of a stereoscopic pair, shown extending from reference line 36 to reference line 38, and $\alpha_R$ for a right-side member, shown extending from reference line 32 to reference line 34. For a given stereoscopic pair, it can be seen that there is a region $\alpha_{LR}$ where the fields of view overlap. The overlapping $\alpha_{LR}$, also referred to as the stereoscopic field of view, defines the area where stereoscopic image data is useful for 3-dimensional modeling. It can also be seen that blind spots exist, along with regions that are seen by only a single digital camera 30. The size of each of these regions will depend on the field of view used.

It can be appreciated that selection of the camera fields of view involves a tradeoff between maximized coverage and resolution. An increased field of view will, of course, improve the amount of image data that can be captured, and in particular increase the amount of useful stereoscopic data as the size of the stereoscopic field of view is increased. However, as the view angle is increased the resolution is decreased. This is illustrated by considering a hypothetical digital camera with a resolution of 4,000 by 4,000 pixels and a field of view of 100°. Dividing 100° by 4,000 pixels gives coverage of 1/40 of a degree per pixel. This yields a resolution of about 1 cm at 23 meters. As digital camera technology improves the resolution will improve. Digital camera resolution has followed Moore's law for semiconductors and has doubled about every year or two, and trend is expected to continue for at least the next fifteen years. An alternate solution to increasing the resolution is to simply use more cameras, each covering a smaller field of view.

Figure 3:
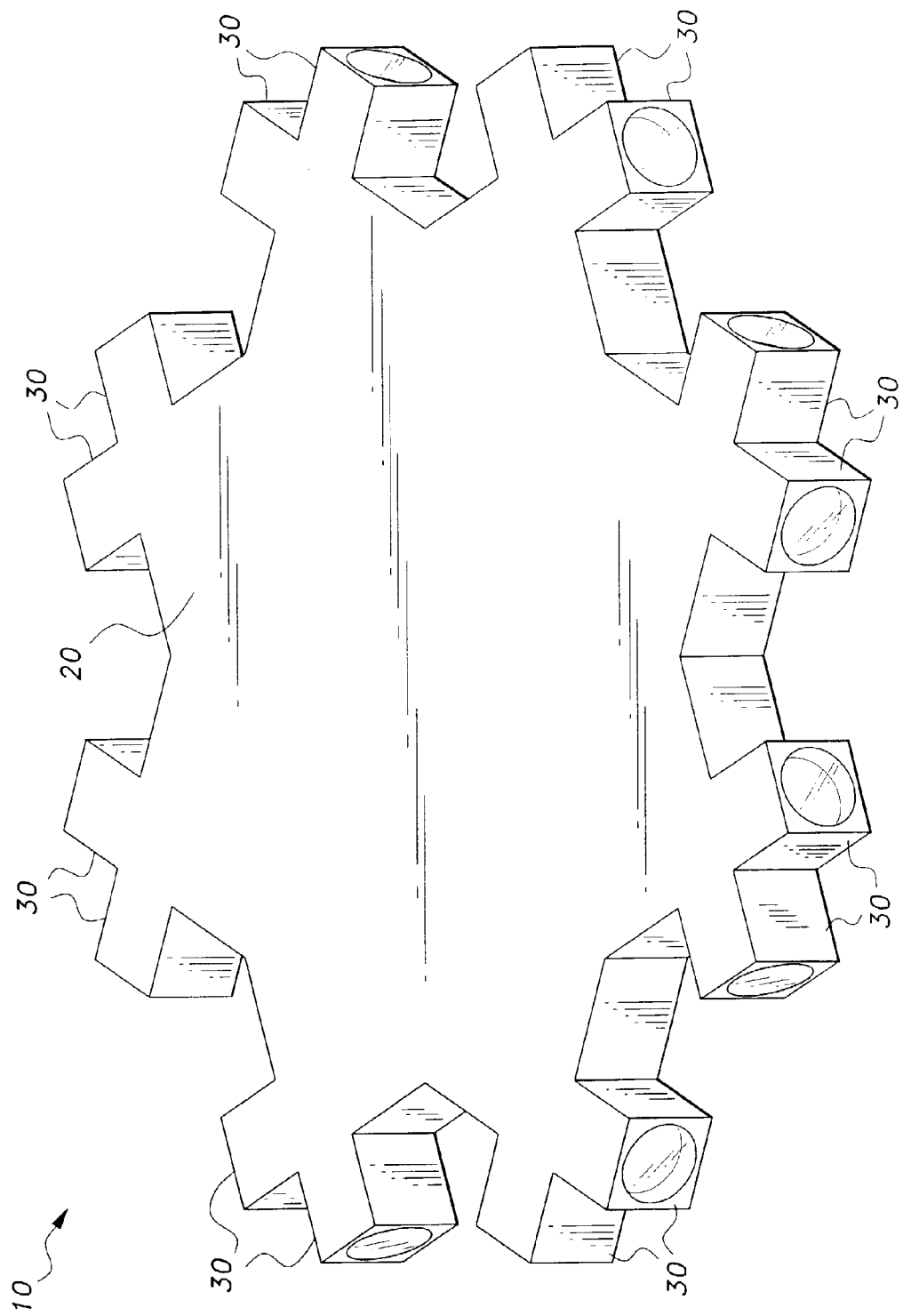
FIG. 3 is a perspective view of an alternate embodiment of the digital 3D/360° camera system having additional stereoscopic camera pairs.

FIG. 3 shows an embodiment of the digital 3D/360° camera system 10 having additional stereoscopic pairs of digital cameras 30. The stereoscopic pairs of digital cameras 30 are arranged so that each stereoscopic pair covers a single octant, rather than a quadrant, of the 360-degree field of view. Thus, the digital cameras 30 may use a field of view of only 50° to achieve full coverage and gain a two-fold increase in the image resolution in comparison to a 1000 field of view.

Figure 4:
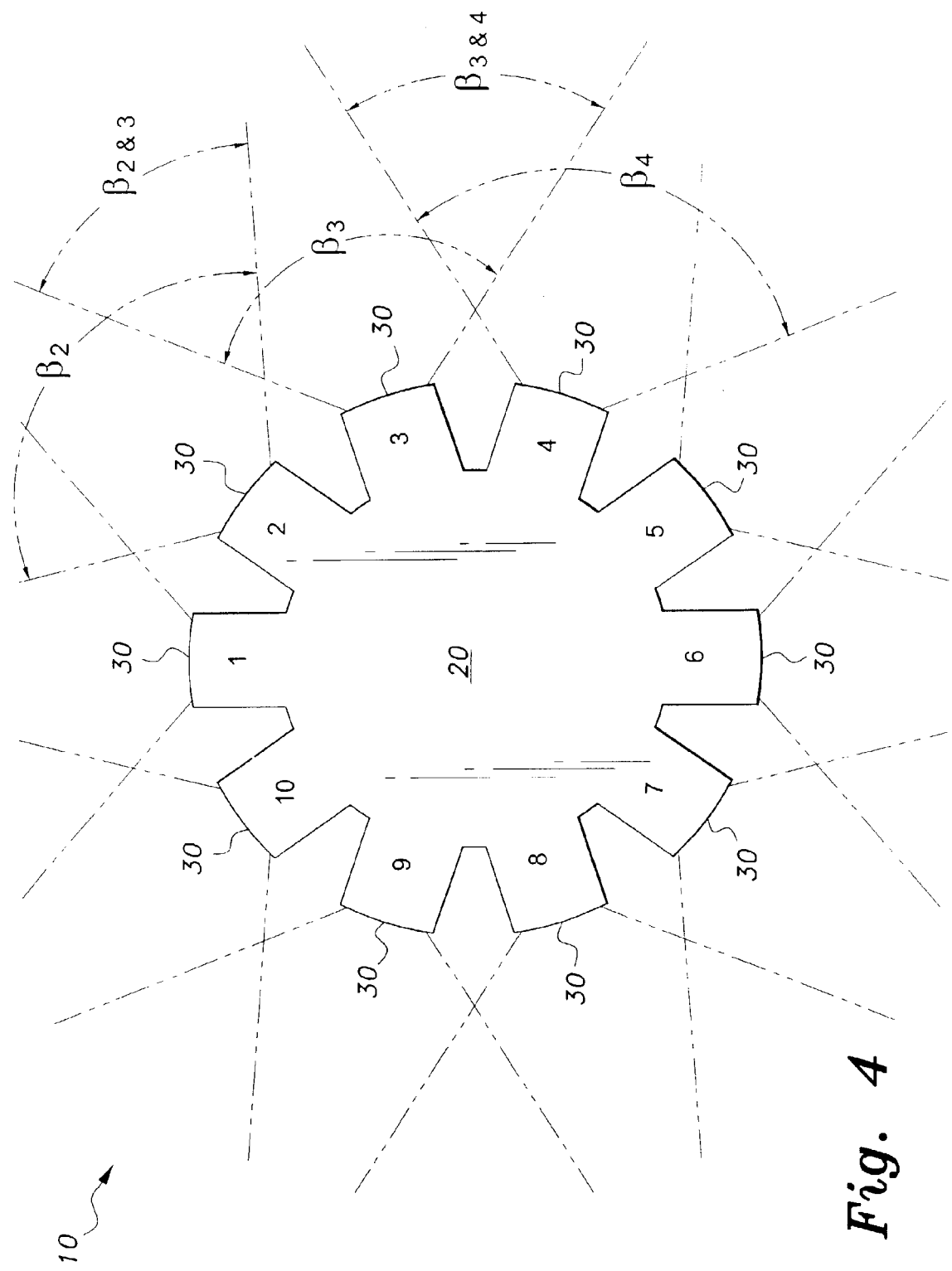
FIG. 4 is a top view of an alternate embodiment of the digital 3D/360° camera system having digital cameras in a circular arrangement.

Another embodiment, shown in FIG. 4, moves away from an arrangement with the digital cameras 30 grouped in literal stereoscopic pairs. Instead, the digital cameras 30 are disposed uniformly surrounding a circular housing. In this arrangement, each digital camera 30 shares a stereoscopic field of view with each of its adjacent digital cameras 30. As illustrated, a field of view $\beta_3$ overlaps with the field of view $\beta_2$ to form the stereoscopic field of view $\beta_{23}$, and also overlaps with the field of view $\beta_4$ to form the stereoscopic field of view $\beta_{34}$.

Figure 5:
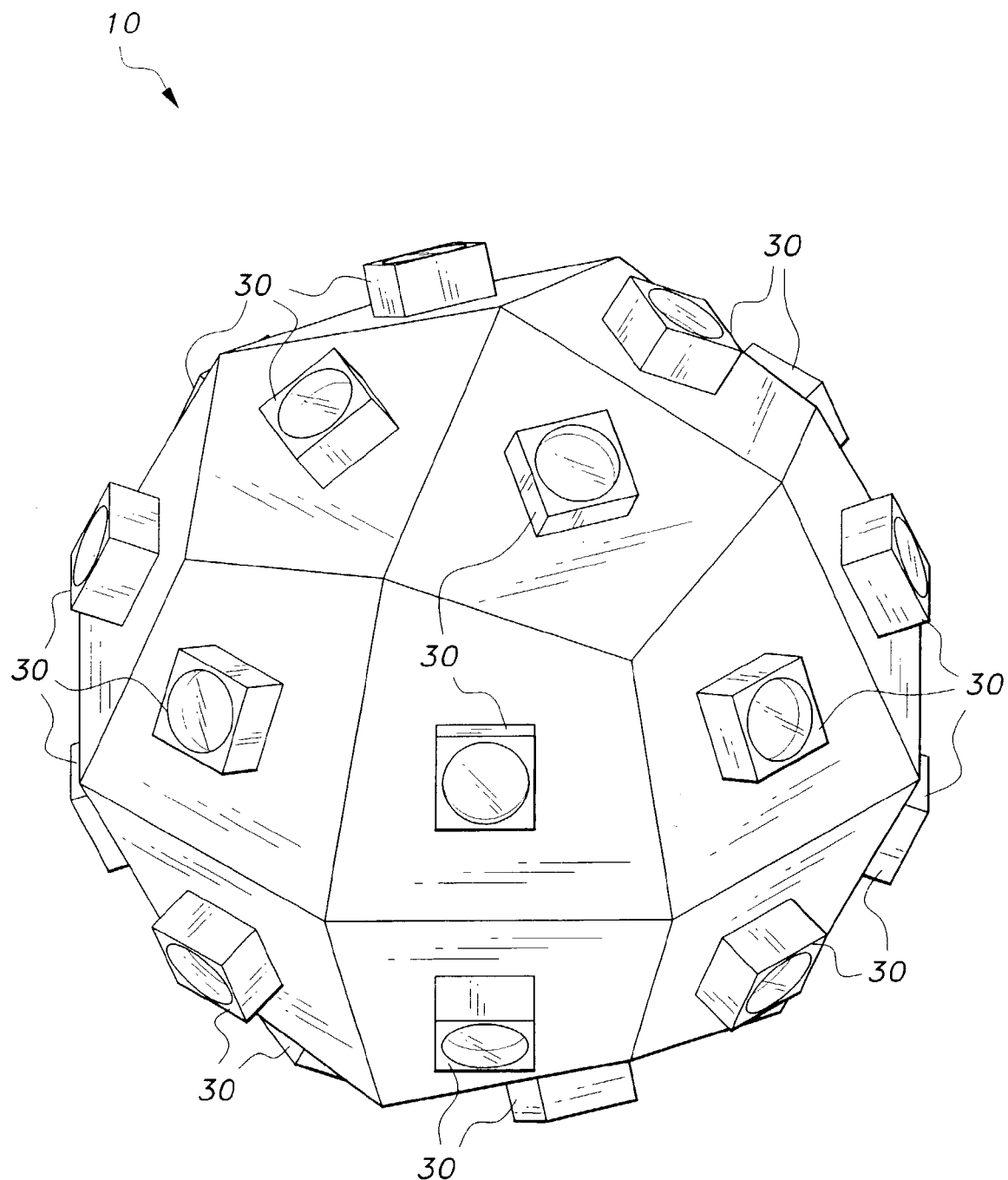
FIG. 5 is a perspective view of an embodiment of the digital 3D/360° camera system having digital cameras in a spherical arrangement.

An additional embodiment extends the circular arrangement of digital cameras 30 into a full sphere, such as shown in FIG. 5, with the digital cameras around a spherical housing. The spherical arrangement distributed of digital cameras 30 allows the maximum coverage, gathering not only a 360° panorama, but gathering total image data for a scene.

It can now be appreciated that a variety of embodiments, each with a differing number and arrangement of digital cameras 30, may be employed. A common feature among all of the embodiments is that the digital cameras 30 are in fixed positions, and are arranged so that each digital camera 30 has a field of view that overlaps with the field of view of at least one other digital camera 30 to form a stereoscopic field of view. The multiple stereoscopic fields of view provided by the multiple combinations of digital cameras 30 provide the 3-dimensional image data that is necessary for accurate 3-dimensional modeling.

Figure 6:
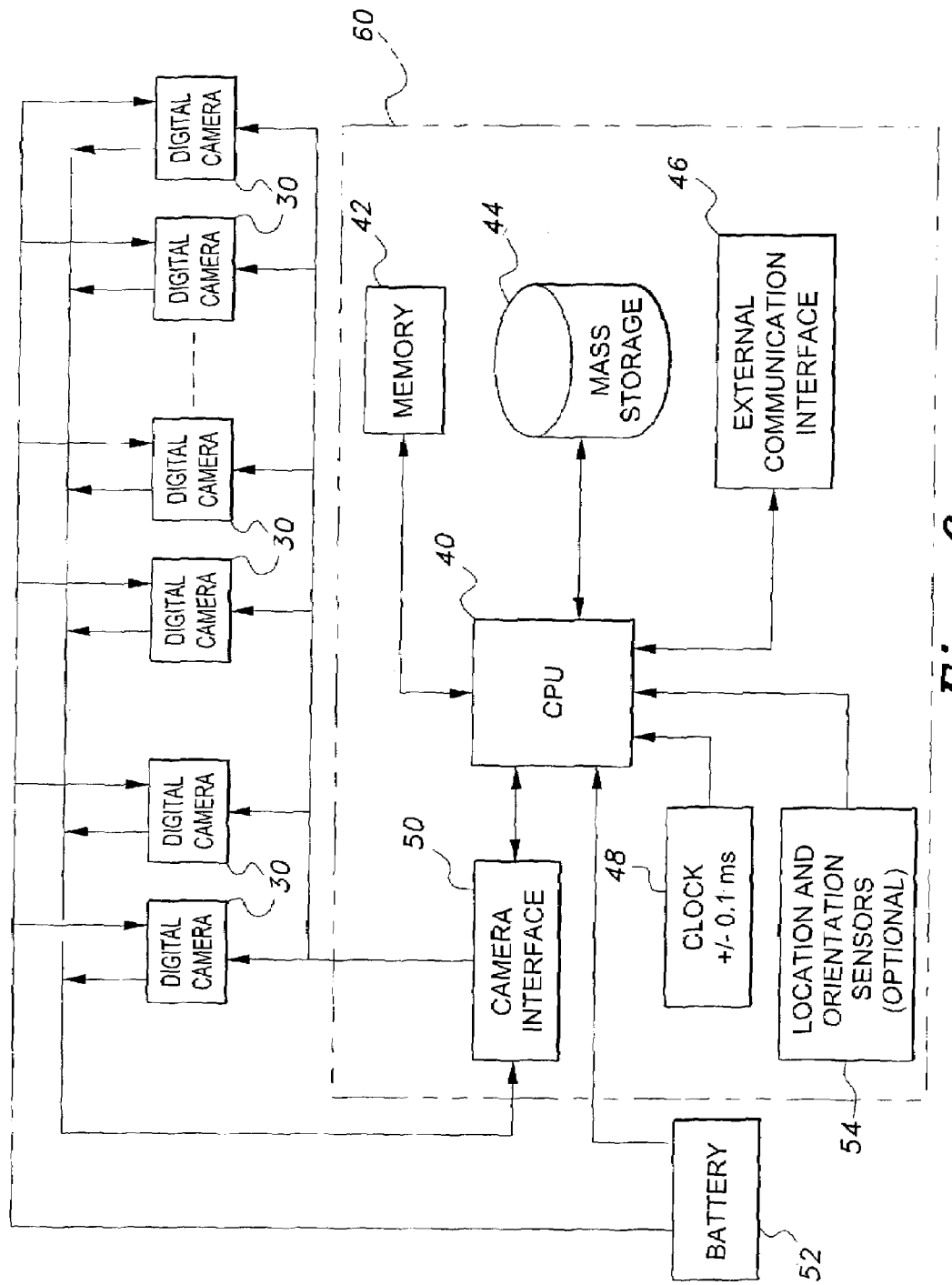
FIG. 6 is a block diagram of the digital 3D/360° camera system according to the present invention.

The digital cameras 30 are under the control of a controller 60, which is depicted schematically in FIG. 6. The controller 60 is a system that includes a CPU 40, a memory 42, a mass storage device 44, a clock 48, an external communication interface 46, and a camera interface 50. The system could be a general-purpose computer system such as a Personal Computer (PC), or a custom-designed computer system. The controller 60 could be located externally from the housing 20, but it is preferred that the controller 60 be contained within the housing 20.

The digital cameras 30 have a command and data interface that is in connection with the camera interface 50. Commercially available digital cameras are typically available with a Universal Serial Bus (USB), FireWire, or another interface for command and data transfer. Thus, the camera interface 50 includes a USB, FireWire, or another interface for command and data transfer. Additionally it is desirable, although not necessary, that the digital cameras 30 be equipped with a single digital control line that will allow a digital signal to cause the digital camera 30 to capture an image. Use of a single digital control line allows all of the digital cameras 30 to be commanded simultaneously, by a single digital control signal, to capture an image.

The clock 48 is used to schedule image capture, to tag image data files that are captured, and to synchronize command of the digital cameras 30. Because an accurate time reference is needed for all of these functions, the clock 48 should have a resolution and accuracy within 0.1 ms. Additionally, a time base that is accurate and synchronized to, or based on, a common standard time reference, such as Universal Coordinated Time (UTC) facilitates synchronization of multiple digital 3D/360° camera systems 10 in applications using multiple digital 3D/360° camera systems 10 in order to capture additional points of view.

The external communication interface 46 may be any data communication interface, and may employ a wired, fiber-optic, wireless, or another method for connection with an external device. Ethernet or wireless-Ethernet are exemplary.

The controller 60 may optionally include location and orientation sensors 54 to determine the location and orientation of the digital 3D/360° camera system. For example, a global positioning system (GPS) receiver is useful where the geographic position of the digital 3D/360° camera system 10 must be captured along with the image data. A digital magnetic compass can be used to determine the orientation of the digital 3D/360° camera system in relation to magnetic north.

A computer software program, stored on the mass storage device 44 and executed in the memory 42 by the processor 40, directs the controller to perform various functions, such as receiving commands from an external device on the external communication interface, managing data files defining the precise geometry of the digital cameras 30, commanding the digital cameras 30 to capture image data, tagging and storing image data files, and delivering the image data files to an the precise geometry of the digital cameras 30 may include performing calibration steps to create the data files, or downloading the data files from an external source.

The image data captured by the digital 3D/360° camera system 10 may be used to create 3-dimensional images and models. For 3-dimensional imaging and modeling, it is necessary to know the precise geometry of each camera 30 in the system, including each pixel.

Figure 8A:
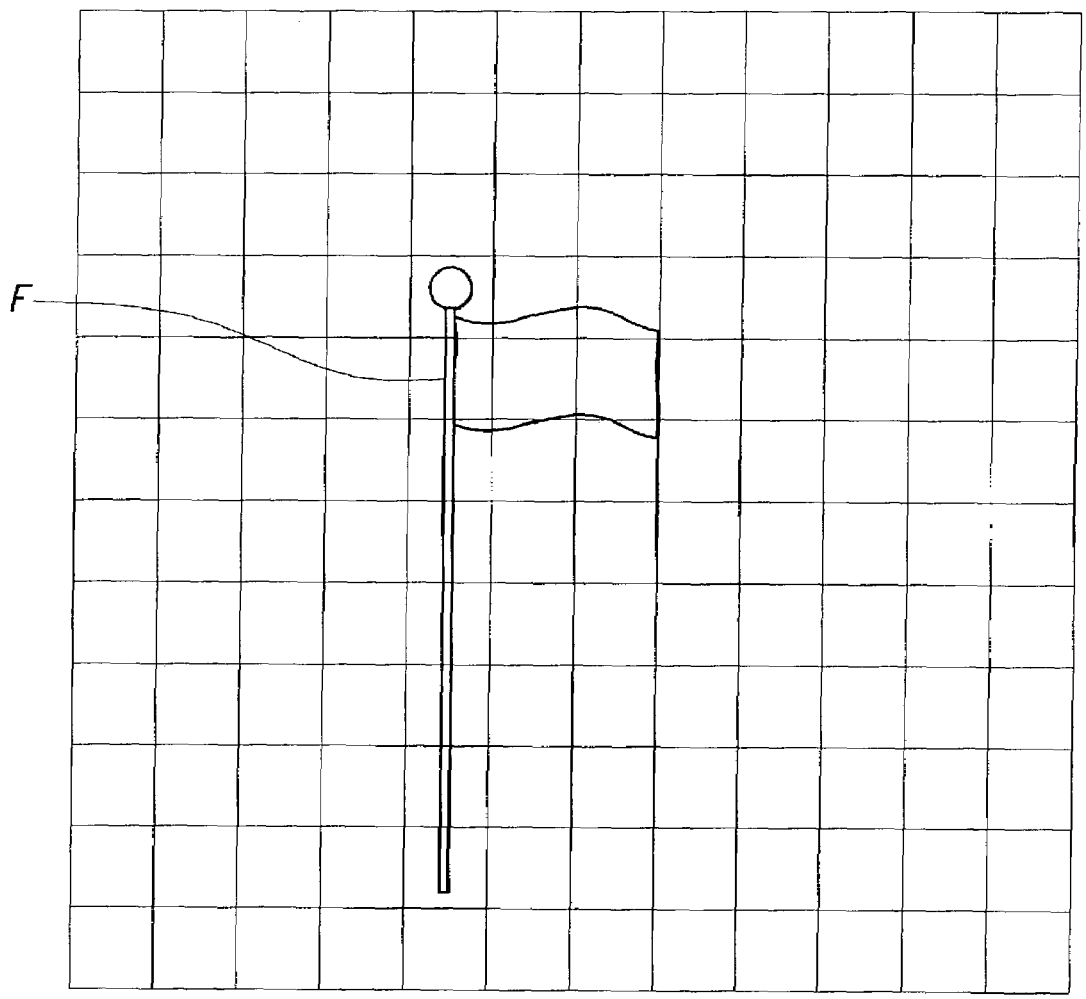
FIG. 8A is a diagrammatic illustration of the field of view of a digital camera expressed as an array of pixels.
Figure 8B:
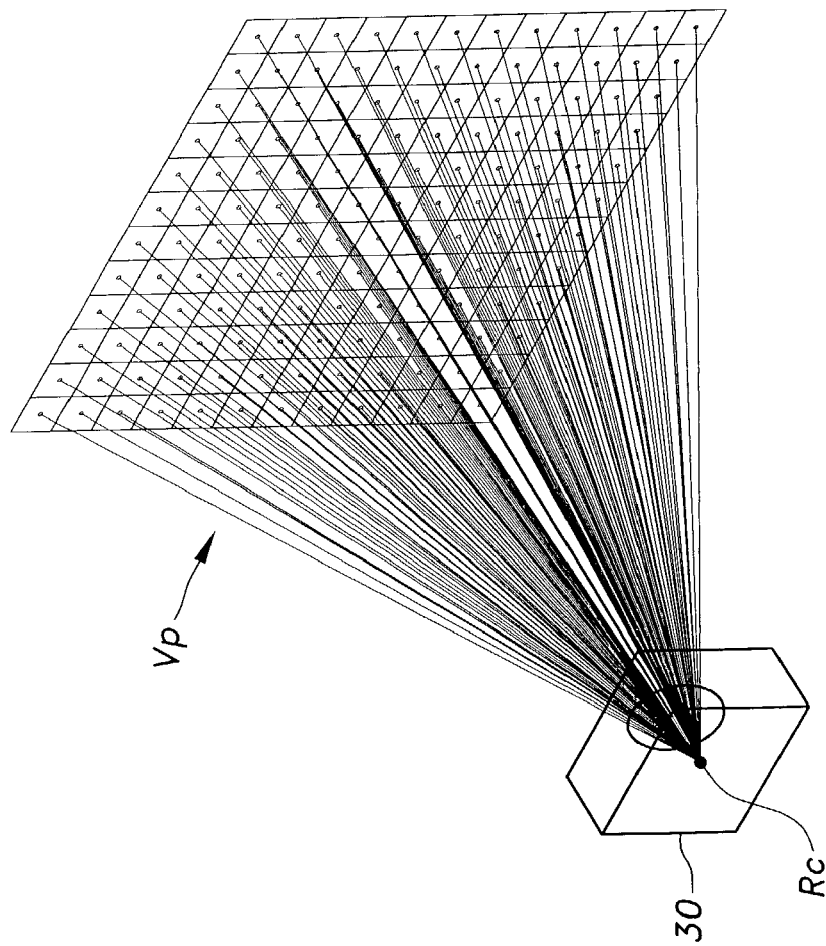
FIG. 8B is a diagrammatic illustration of the field of view of a digital camera expressed 3-dimensionally as an array of pixel vectors.

A digital camera captures images as an array of pixels, as illustrated by FIG. 8A which shows an image of a flag F mapped onto a pixel array. From a 3-dimensional perspective, the digital camera's image can also be considered as an array of pixel vectors $V_p$, illustrated in FIG. 8B. Each vector is a straight line from the cameras lens to objects in the field of view. A pixel vector VP can be defined by identifying a camera reference point $R_c$ in 3D space as the beginning of the pixel vector $V_p$, and a "directional vector" defining the pixel vector's path. Every pixel in a camera has a unique pixel vector $V_p$, Thus, a pixel vector map for a camera is a definition of the paths of every pixel in the camera.

The reference point $R_c$ and directional vector for each pixel vector $V_p$ will be static if the lens has a fixed focus. If the lens has variable focus, the reference point $R_c$ and directional vectors change along with the change in focus. For a variable focus lens, multiple pixel maps for different focus settings are necessary in order to maintain maximum accuracy.

In an accurate fixed focus lens, the reference point $R_c$ can be considered the same as the optical center of the lens, and is the same for each pixel vector $V_p$.

The pixel vector map for a camera can be created by analysis of the camera's design specs, or through a mechanical calibration process. Calibration can be performed by exposing each pixel in the camera to two distinct known points in 3D space. Since each pixel vector $V_p$ is a straight line, and two points describe a straight line, this procedure can be used to determine the camera's pixel vector map.

Figure 9:
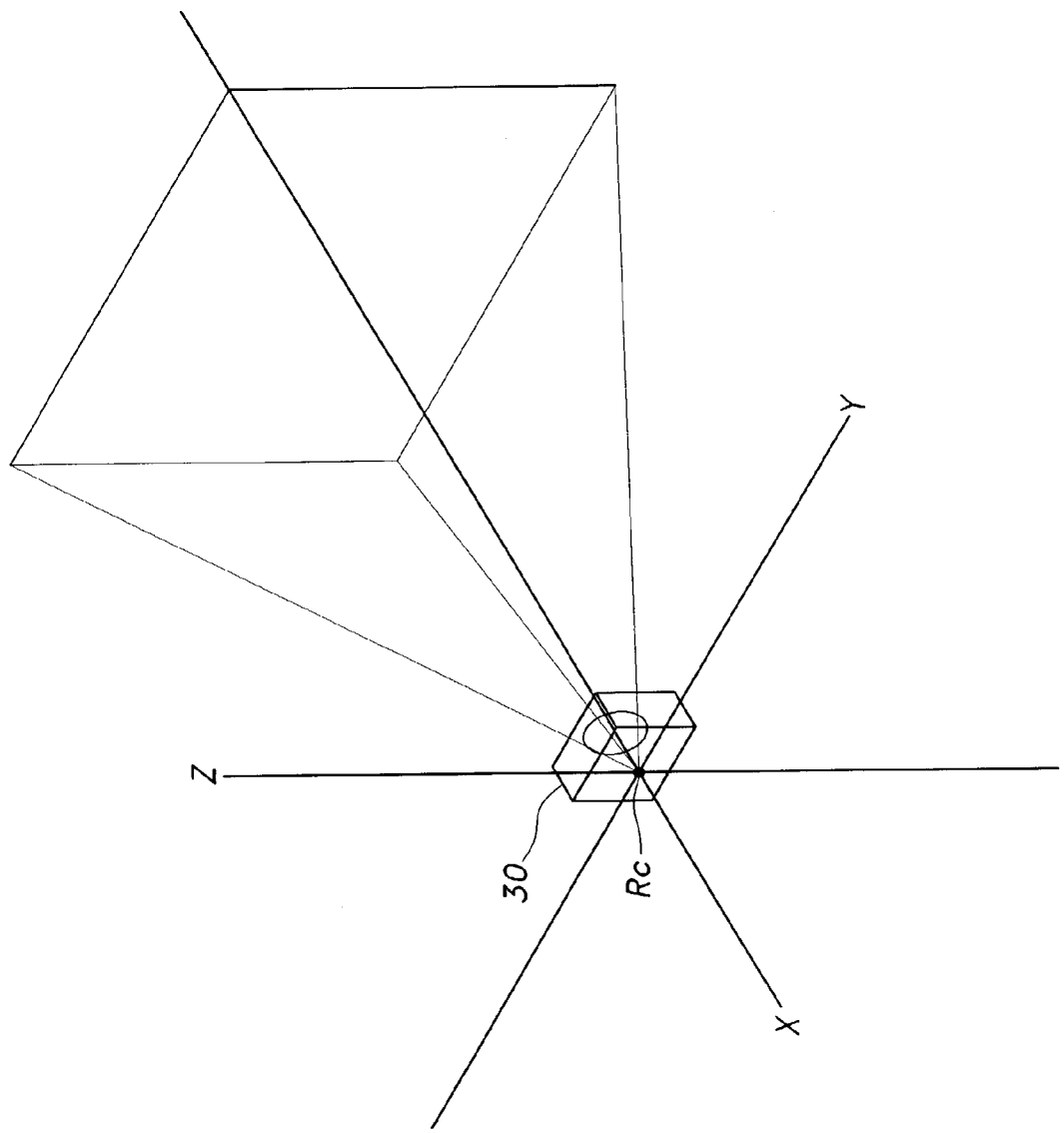
FIG. 9 is a schematic illustration of the field of view of a camera in relation to a reference point that is the origin of a 3-dimensional XYZ coordinate system.

A pixel vector map is created for each digital camera 30 in the digital 3D/360° camera system 10. The pixel vector map for each camera includes a definition of a coordinate system in relation to the camera. For example, as illustrated in FIG. 9, a rectangular XYZ coordinate system could be used. The pixel vector map also defines a reference point $R_c$ for the camera, such as the optical center of the camera. Each pixel in the pixel vector map is uniquely identifiable, such as by the pixel's row and column coordinates. The pixel vector map additionally includes the directional vector for each pixel. In the case of a rectangular XYZ coordinate system, the directional vector may be expressed in signed XYZ format.

If the camera uses a variable focus lens, either multiple pixel vector maps are defined or a single pixel vector map is defined along with a means of correction or interpolation for different focus settings.

The precision of the reference point and each directional vector determines the precision of the digital 3D/360° camera system 10 for 3-dimensional modeling. The pixel vector map for a single camera can be deduced from the camera design, or can be determined by a calibration process.

In the digital 3D/360° camera system 10, a pixel vector map for the entire digital 3D/360° camera system 10 includes the pixel vector map for each individual digital camera 30, along with information that defines the position of each individual digital camera 30 in relation to each of the others. An easy way to accomplish this is to define an XYZ coordinate system and point of origin for the digital 3D/360° camera system 10 and to use that coordinate system when describing each camera's pixel vector map. The reference point for the digital 3D/360° camera system 10, referred to as the system reference point, could be the physical center of the camera assembly, the front of the system, the reference point of a single digital camera, or any other point in 3D space.

Figure 10:
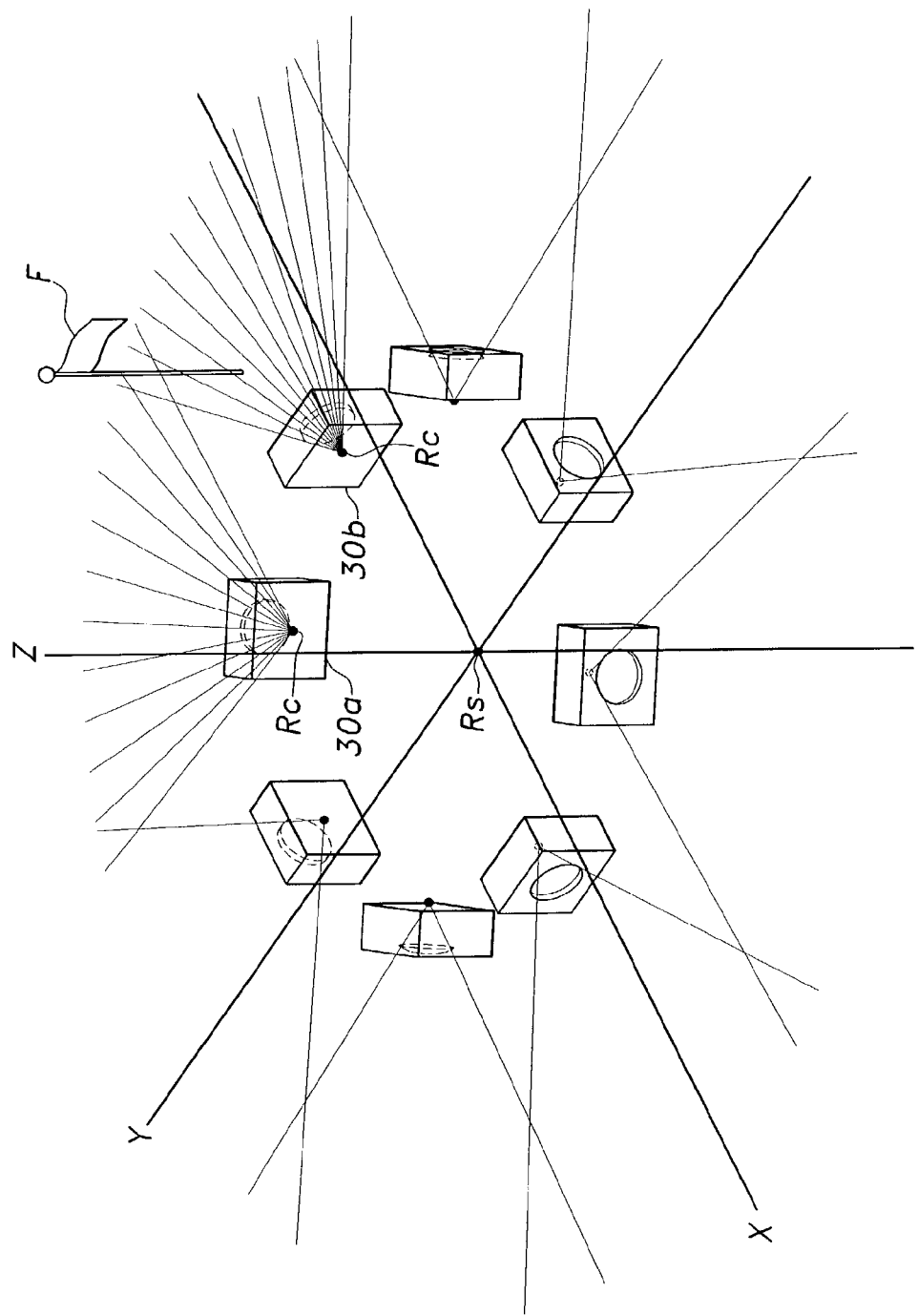
FIG. 10 is a diagram illustrating a plurality of digital cameras, each with their own camera reference point, relative to a system reference point and XYZ coordinate system.

Because the digital 3D/360° camera system 10 is used to create accurate 3D models, the actual distances between the reference points of each of the digital cameras 30 must be known. Referring to FIG. 10, for example, if, relative to the digital 3D/360° camera system's 10 reference point, the reference point for digital camera 30a is (0", 7", 0") and the reference point for digital camera 30b is at (3", 3", 0"), then it can be seen that a vector from digital camera 30a to digital camera 30b is (3", −4", 0") and the distance from digital camera 30a to digital camera 30b is five inches.

By knowing the internal dimensions of the digital 3D/360° camera system 10 and the precise geometry of the digital cameras 30, dimensions and distances of objects in view of two or more of the digital cameras 30 can be determined. The accuracy with which the internal dimensions and camera geometries are known determines the accuracy of the measurements and models that the digital 3D/360° camera system 10 can make.

Figure 11B:
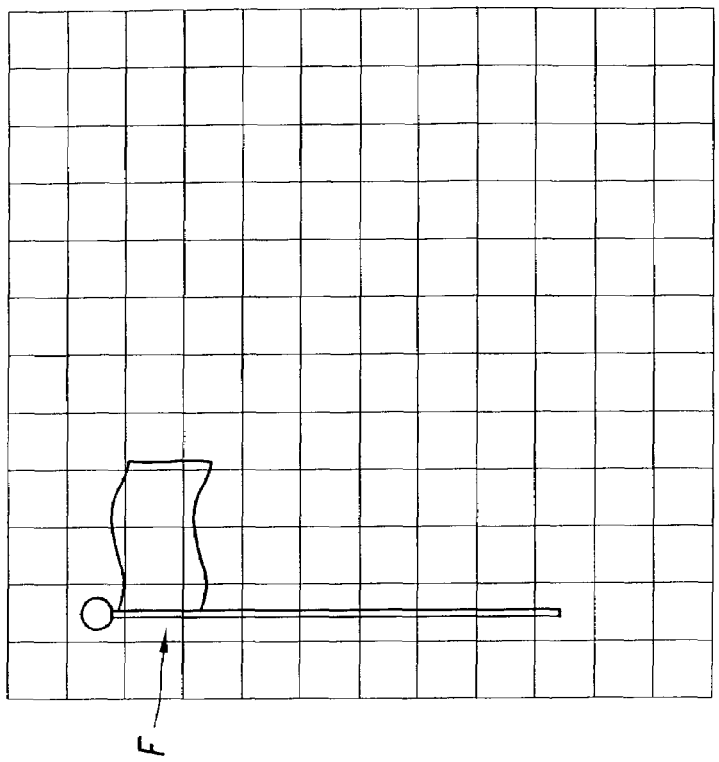
FIG. 11B is a diagram showing the field of view of digital camera 30b in FIG. 10.
Figure 11A:
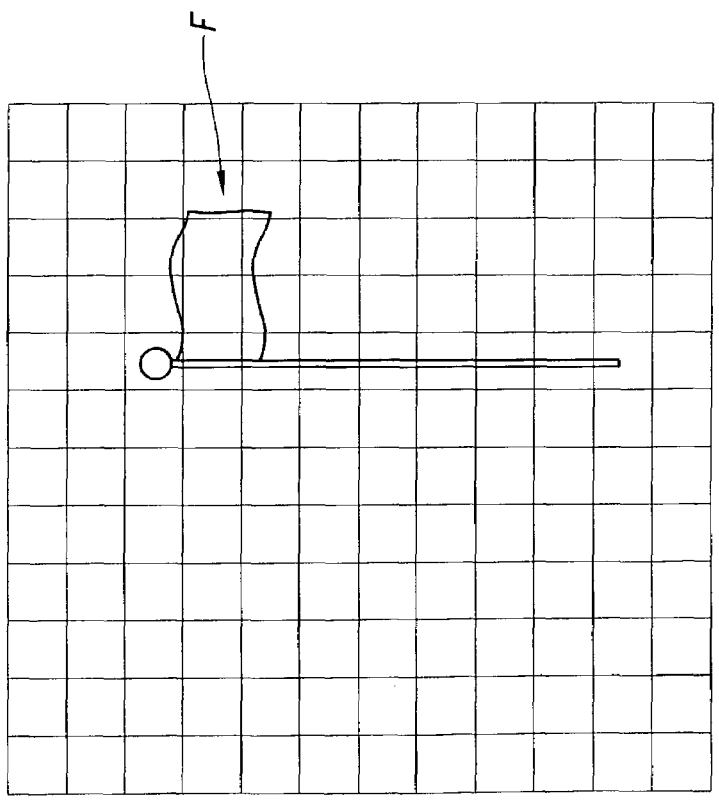
FIG. 11A is a diagram showing the field of view of digital camera 30a in FIG. 10.

Along with the pixel vector map for the digital 3D/360° camera system 10, image data captured by the digital cameras 30 can be used for 3-dimensional modeling by determining the distance between the system reference point and various points of interest in the image data. The distance may be determined for every point of image data that is captured by two or more of the digital cameras 30. Referring to FIG. 10, a flag F is illustrated in the field of view of both camera 30a and camera 30b. Turning to FIGS. 11A and 11B, it can be seen that the flag F appears in a different position in the field view of each camera. FIG. 11A illustrates a field of view for camera 30a, while FIG. 11B illustrates camera 30b. It can be seen that one pixel, or in 3-dimensional terms one pixel vector, from each camera captures the top of the flagpole, the point of interest for this example.

Figure 12:
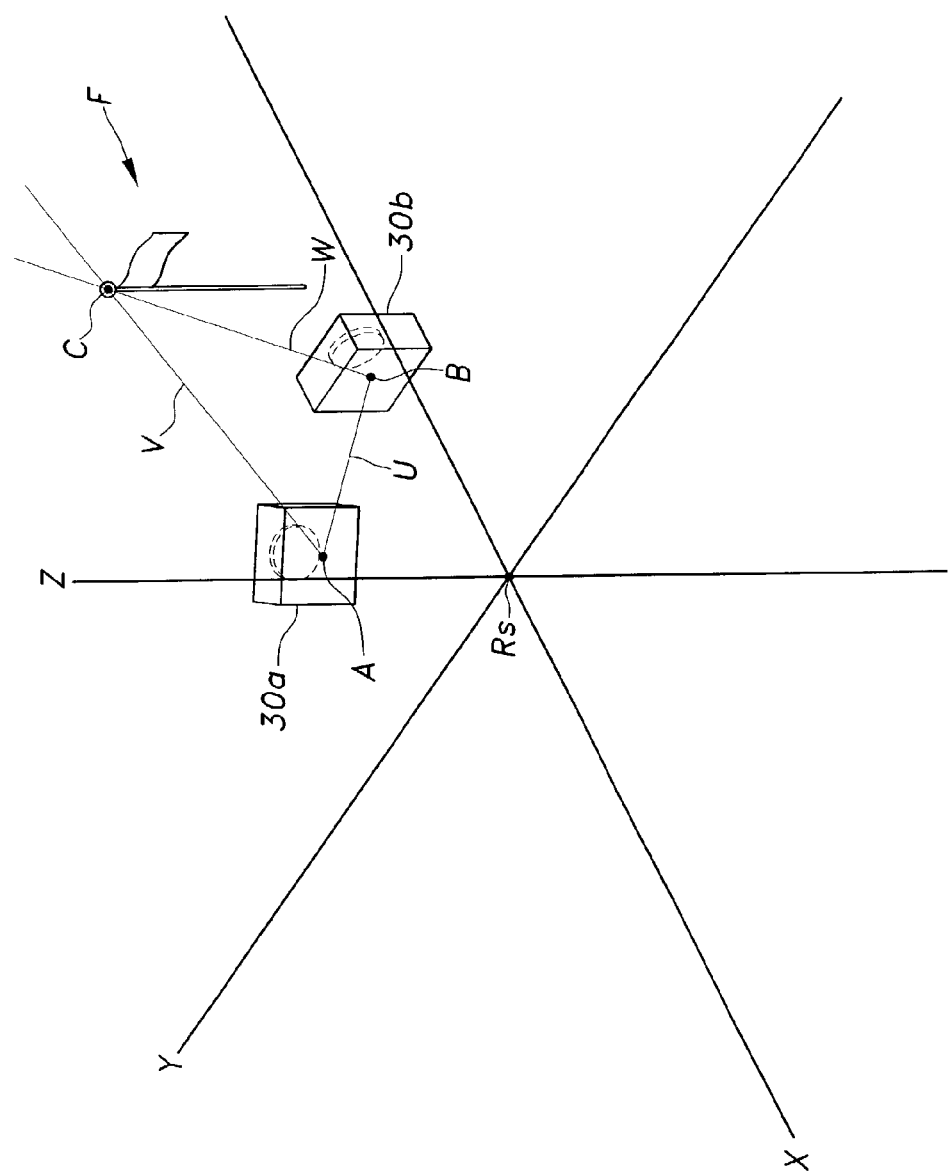
FIG. 12 is a diagram illustrating a method of resolving pixel vectors into a known position in the XYZ coordinate system relative to the system reference point.

Shown more clearly in FIG. 12, pixel vector V is the pixel vector for camera 30a that captures the top of the flagpole, while pixel vector W captures the top of the flagpole in camera 30b. The top of the flagpole is represented by point C. Each pixel vector is a directional vector, describing the direction from the camera's reference point to point C at the top of the flagpole, but not the distance. A distance vector "a*V", where "a" is a scalar, defines the line starting at point A, the reference point for camera 30a, and ending at point C. Similarly, distance vector "b*W", where "b" is a scalar, defines, for camera 30b, the line from point B to point C.

What is desired is to know the position of C relative to the system reference point $R_s$. The locations of camera reference points A and B are known from their pixel vector map information. The vector U=B−A represents the displacement from A to B. Since V and W are linearly independent, the cross product vector Y=V×W is nonzero. Also, the three vectors U=B−A, V, and W are linearly dependent assuming that C exists. C can now be defined by:

$$C = A + aV = B + bW \quad (1)$$

where a and b are scalars. Rewriting (1), $$aV = U + bW \quad (2)$$

Taking a cross product with W and V, respectively, gives:

$$a(V \times W) = (U \times W) \text{ and} \quad (3)$$

$$b(W \times V) = -(U \times V) \quad (4)$$

which uniquely determines the coefficients a and b. These can be determined using dot products:

$$a = ((U \times W) \cdot (V \times W))/((V \times W) \cdot (V \times W)); \text{ and} \quad (5)$$

$$b = ((U \times V) \cdot (V \times W))/((V \times W) \cdot (V \times W)) \quad (6)$$

Referring back to (1), and solving for C, $$C = A + ((U \times W) \cdot (V \times W))/((V \times W) \cdot (V \times W))V \quad (7)$$

Point C, the top of the flagpole in the current example, has now been located precisely within the XYZ coordinate system of the digital 3D/360° camera system 10. Using the same mathematical analysis, each point within the field of view of the digital 3D/360° camera system 10 may be precisely located in a 3-dimensional coordinate system.

The pixel vector map for the digital 3D/360° camera system 10 is a collection of data that describes the geometry of each of the digital cameras 30 in the system. The pixel vector map data is stored on the mass storage device 44 in a pixel vector map file, along with additional data relating to and describing the digital 3D/360° camera system 10. In practice, the additional data describing the digital 3D/360° camera system 10 may include a serial number, name, model type, or other information describing the digital 3D/360° camera system 10 itself along with serial numbers, type, lens type, and other information describing each of the digital cameras 30 in the digital 3D/360° camera system 10.

In use, the controller 60 functions to command the digital cameras 30 to capture image data, and then retrieves the image data and stores the image data onto the mass storage device 50. Once the image data is stored on the mass storage device 50, the image data may be exported to an external computer or image processing system by the external communication interface 46.

Figure 7:
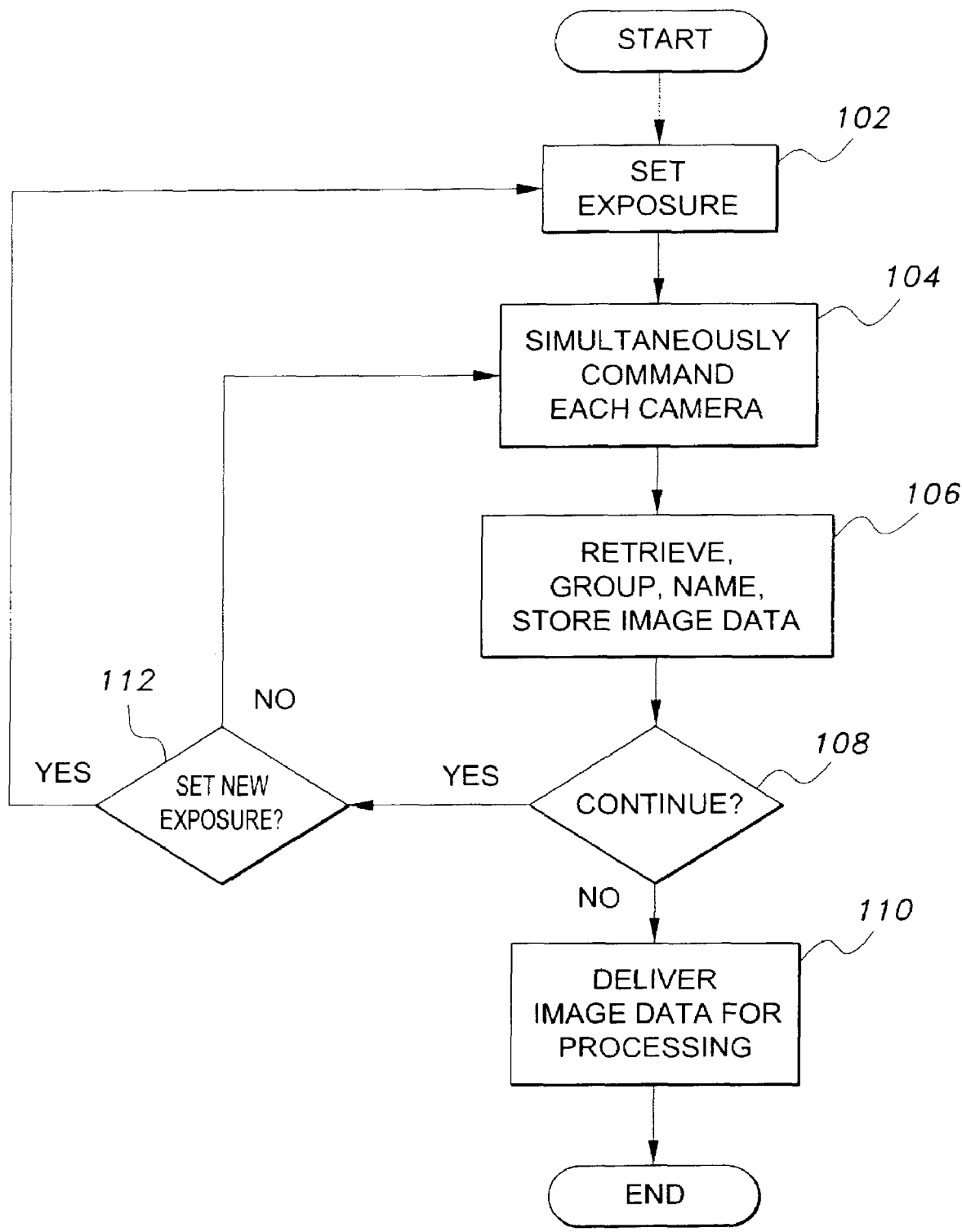
FIG. 7 is a flow chart describing the steps of capturing image data with the digital 3D/360° camera system according to the present invention.

The process of capturing an image is illustrated by the flowchart shown in FIG. 7. The image capture process may be started when a command is received by the external communication interface 46, or based on an internally programmed schedule. Once started, the controller 60 issues a command to each of the digital cameras 30 to set correct exposure parameters, as indicated by block 102. Once the exposure parameters are set, the digital cameras 30 are simultaneously commanded to capture an image, indicated at block 104. It is important to note that as near simultaneous capture of all images as possible is essential to accurate and error-free 3-dimensional modeling of the image data.

Ideally, a digital control line will be used to issue a digital control signal to each of the digital cameras 30 simultaneously. Alternatively, a "fire" command could be sent individually to each digital camera 30 using a command and data interface. If the cameras are individually commanded, a good rule of thumb is that all of the cameras should be commanded within ½ of the exposure time. For example, if an exposure time of 1 ms is used, all of the cameras should be commanded to fire within 0.5 ms.

Once the cameras have fired, as block 106 indicates, the image data is retrieved and stored. Each image from each camera is stored as an individual file. The file may include embedded metadata along with the image data. These image files should be named to identify the exposure, such as by time-stamp, and to identify the camera. The files are stored on the mass storage device 44. If no more pictures are to be taken, a decision evaluated at block 108, then the image data is delivered for processing. The image data may be made available for export by the external communication interface 46 on request by an external processing system or the pictures may be immediately delivered, indicated at block 110. If additional images in a sequence are to be taken, the process returns either to block 102 to set a new exposure or to block 104 to immediately capture a new image.

Still images may be recorded individually or in sequence. Image sequences may be used for 3-dimensional animation or even a 3-dimensional movie. Additionally, multiple digital 3D/360° camera systems may be used in cooperation at separate locations to gather more comprehensive 3-dimentional image data for a larger scene or region.

It is to be understood that the present invention is not limited to the embodiments described above, but encompasses any and all embodiments within the scope of the following claims.

I claim:

1. A digital camera system, comprising:
    a plurality of digital cameras disposed in substantially fixed relation to each other such that each of the plurality of digital cameras has a field of view that overlaps a field of view of at least one other of the plurality of digital cameras to create a stereoscopic field of view;
    a mass storage device storing pixel vector maps for each of the plurality of digital cameras, wherein each of the pixel vector maps defines a coordinate system of the corresponding one of the plurality of digital cameras; and
    a controller that substantially simultaneously activates the plurality of digital cameras to capture image data for a three-hundred-and-sixty degree horizontal stereoscopic field of view; and
    a processor executing software that generates a first digital three-dimensional model of the three-hundred-and-sixty degree horizontal stereoscopic field of view using the image data captured by the plurality of digital cameras and the pixel vector maps,
    wherein the controller further captures additional image data from a separate location, and
    the software generates a second digital three-dimensional model from the additional image data and merges the first and second digital three-dimensional models to create a comprehensive digital three-dimensional model.

2. The system of claim 1, wherein each of the digital cameras are commanded in synchronization to capture the image data.

3. The system of claim 1, wherein the controller further includes a clock that synchronizes command of the digital cameras.

4. The system of claim 1, wherein the controller further includes location and orientation sensors to determine a location and orientation of the system.

5. The system of claim 1, wherein the controller further includes a global positioning system (GPS) receiver that captures a geographic position of the system.

6. The system of claim 1, wherein the controller further includes a means for commanding the digital cameras to set exposure parameters.

7. The system of claim 1, further comprising:
two additional digital cameras having a field of view upward related to a plane defined by the three-hundred-and-sixty-degree horizontal stereoscopic field of view.

8. The system of claim 1, wherein the plurality of digital cameras are disposed to place the axes of their fields of view in substantially the same horizontal plane.

9. The system of claim 1, wherein each of the pixel vector maps defines reference points for each of the plurality of digital cameras.

10. The system of claim 9, wherein the reference points define optical centers of the plurality of digital cameras.

11. The system of claim 10, wherein the pixel vector maps include directional vectors for the pixels.

12. The system of claim 11, wherein the controller further generates the first or second digital three-dimensional model using the reference points and the directional vectors.

13. The system of claim 12, wherein the controller further generates the first or second digital three-dimensional model by determining a distance between the reference points and one or more points of interest in the first or second digital three-dimensional model.

14. The system of claim 1, wherein the pixel vector maps uniquely identify pixels of the plurality of digital cameras.

15. A method for generating three-dimensional and three-hundred-and-sixty degree models using a digital camera system, the method comprising:
storing pixel vector maps for each of a plurality of digital cameras that are disposed on a support, wherein each of the pixel vector maps defines a coordinate system in relation to one of the plurality of digital cameras;
commanding each of the plurality of digital cameras to simultaneously capture image data, wherein each of the plurality of digital cameras has a field of view that overlaps a field of view of at least one other of the plurality of digital cameras to create a stereoscopic field of view and collectively encompasses a three-hundred-and-sixty-degree horizontal stereoscopic field of view;
generating a first digital three-dimensional model of the three-hundred-and-sixty degree horizontal stereoscopic field of view using the image data captured by the plurality of digital cameras and the pixel vector maps;
capturing additional image data from a separate location;
generating a second digital three-dimensional model from the additional image data; and
merging the first and second digital three-dimensional models to create a comprehensive digital three-dimensional model.

16. The method of claim 15, further comprising:
displaying the first or second digital three-dimensional model in a human-viewable format.

17. The method of claim 15, wherein generating the first or second digital three-dimensional model includes exporting the captured image data of each of the digital cameras to an external processing system.

18. The method of claim 15, wherein generating the first or second digital three-dimensional model includes determining a distance between a system reference point and points of interest in the digital three-dimensional model.

19. The method of claim 15, wherein a digital control signal is transmitted over a digital control line to each of the digital cameras in order to command the digital cameras to simultaneously capture the image data.

20. The method of claim 15, wherein each of the pixel vector maps defines reference points for each of the plurality of digital cameras.

21. The method of claim 20, wherein the reference points define optical centers of the plurality of digital cameras.

22. The method of claim 21, wherein the pixel vector maps include directional vectors for the pixels.

23. The method of claim 22, wherein generating the first or second digital three-dimensional model further includes using the reference points and the directional vectors.

24. The method of claim 23, wherein generating the first or second digital three-dimensional model further includes determining a distance between the reference points and one or more points of interest in the first or second digital three-dimensional model.

25. The method of claim 15, wherein the pixel vector maps uniquely identify pixels of the plurality of cameras.

26. A computer-readable medium encoded with computer-executable instructions for using a digital camera system according to a method, the method comprising:
storing pixel vector maps for each of a plurality of digital cameras that are disposed in substantially fixed relation to each other, wherein each of the pixel vector maps defines a coordinate system in relation to one of the plurality of digital cameras;
commanding each of the plurality of digital cameras to simultaneously capture image data, wherein each of the plurality of digital cameras has a field of view that overlaps a field of view of at least one other of the plurality of digital cameras to create a stereoscopic field of view and collectively encompasses a three-hundred-and-sixty-degree horizontal stereoscopic field of view;
generating a first digital three-dimensional model of the three-hundred-and-sixty degree horizontal stereoscopic field of view using the image data captured by the plurality of digital cameras and the pixel vector maps;
capturing additional image data from a separate location;
generating a second digital three-dimensional model from the additional image data; and
merging the first and second digital three-dimensional models to create a comprehensive digital three-dimensional model.

27. The computer-readable medium of claim 26, wherein generating the first or second digital three-dimensional model includes exporting the captured image data of each of the digital cameras to an external processing system.

28. A method for generating three-dimensional and three-hundred-and-sixty degree models using a system, the method comprising:
storing pixel vector maps for each of a plurality of digital cameras that have a fixed position with respect to each other, wherein each of the pixel vector maps defines a coordinate system in relation to one of the plurality of digital cameras;
commanding each of the plurality of digital cameras to simultaneously capture image data, wherein each of the plurality of digital cameras has a field of view that overlaps a field of view of at least one other of the plurality of digital cameras to create a stereoscopic field of view and collectively encompasses a three-hundred-and-sixty-degree horizontal stereoscopic field of view;
generating a first digital three-dimensional model of the three-hundred-and-sixty degree horizontal stereoscopic field of view using the image data captured by the plurality of digital cameras and the pixel vector maps;

capturing additional image data from a separate location;
generating a second digital three-dimensional model from the additional image data; and
merging the first and second digital three-dimensional models to create a comprehensive digital three-dimensional model.

29. The method of claim 28, wherein the plurality of digital cameras are rigidly mounted on a support.

30. The method of claim 28, further comprising:
calibrating the system by determining geometric relationships between the fixed positions of the plurality of digital cameras.

31. The method of claim 30, wherein the calibration includes exposing each pixel of each of the plurality of digital cameras to two distinct and known points in 3D space.

32. A digital camera system, comprising:
a plurality of digital cameras rigidly disposed in a substantially fixed relation to each other such that the plurality of digital cameras have field of views that overlap a field of view of at least one other of the plurality of digital cameras to create a stereoscopic field of view, wherein the plurality of digital cameras are rigidly disposed to maintain an orientation with respect to each other within an angle per pixel for the plurality of digital cameras that is equivalent to a field of view angle divided by a number of pixels in a horizontal direction;
a mass storage device storing pixel vector maps for the plurality of digital cameras, wherein the pixel vector maps define a coordinate system of the corresponding one of the plurality of digital cameras; and
a controller that substantially simultaneously activates the plurality of digital cameras to capture image data for a three-hundred-and-sixty degree horizontal stereoscopic field of view.

33. The digital camera system of claim 32, wherein:
the plurality of digital cameras are rigidly mounted on a housing, and
geometry of the plurality of digital cameras is determined by a calibration process that constructs the pixel vector maps.

34. The digital camera system of claim 32, further comprising:
a processor executing software that generates a first digital three-dimensional model of the three-hundred-and-sixty degree horizontal stereoscopic field of view using the image data captured by the plurality of digital cameras and the pixel vector maps.

35. The digital camera system of claim 34, wherein the controller further captures additional image data from a separate location, and the software generates a second digital three-dimensional model from the additional image data and merges the first and second digital three-dimensional models to create a comprehensive digital three-dimensional model.

36. A method for using a digital camera system, the method comprising:
storing pixel vector maps for a plurality of digital cameras that are rigidly disposed in a substantially fixed relation to each other, wherein the pixel vector maps define coordinate systems in relation to one of the plurality of digital cameras and the plurality of digital cameras are rigidly disposed to maintain an orientation with respect to each other within an angle per pixel for the plurality of digital cameras that is equivalent to a field of view angle divided by a number of pixels in a horizontal direction; and
commanding the plurality of digital cameras to simultaneously capture image data, wherein the plurality of digital cameras have fields of view that overlap a field of view of at least one other of the plurality of digital cameras to create a stereoscopic field of view and collectively encompasses a three-hundred-and-sixty-degree horizontal stereoscopic field of view.

37. The method of claim 36, wherein:
the plurality of digital cameras are rigidly mounted on a housing, and
geometry of the plurality of digital cameras is determined by a calibration process that constructs the pixel Vector maps.

38. The method of claim 36, further comprising:
generating a first digital three-dimensional model of the three-hundred-and-sixty degree horizontal stereoscopic field of view using the image data captured by the plurality of digital cameras and the pixel vector maps.

39. The method of claim 38, further comprising:
capturing additional image data from a separate location;
generating a second digital three-dimensional model from the additional image data; and
merging the first and second digital three-dimensional models to create a comprehensive digital three-dimensional model.

40. A computer-readable medium encoded with computer-executable instructions for using a digital camera system according to a method, the method comprising:
storing pixel vector maps for a plurality of digital cameras that are rigidly disposed in a substantially fixed relation to each other, wherein the pixel vector maps define coordinate systems in relation to one of the plurality of digital cameras and the plurality of digital cameras are rigidly disposed to maintain an orientation with respect to each other within an angle per pixel for the plurality of digital cameras that is equivalent to a field of view angle divided by a number of pixels in a horizontal direction; and
commanding the plurality of digital cameras to simultaneously capture image data, wherein the plurality of digital cameras have fields of view that overlap a field of view of at least one other of the plurality of digital cameras to create a stereoscopic field of view and collectively encompasses a three-hundred-and-sixty-degree horizontal stereoscopic field of view.

41. The computer-readable medium of claim 40, wherein:
the plurality of digital cameras are rigidly mounted on a housing, and
geometry of the plurality of digital cameras is determined by a calibration process that constructs the pixel vector maps.

42. The computer-readable medium of claim 40, further comprising:
generating a first digital three-dimensional model of the three-hundred-and-sixty degree horizontal stereoscopic field of view using the image data captured by the plurality of digital cameras and the pixel vector maps.

43. The computer-readable medium of claim 42, further comprising:
capturing additional image data from a separate location;
generating a second digital three-dimensional model from the additional image data; and
merging the first and second digital three-dimensional models to create a comprehensive digital three-dimensional model.

* * * * *